United States Patent [19]

Dietrich et al.

[11] Patent Number: 4,539,598

[45] Date of Patent: Sep. 3, 1985

[54] IMAGE READOUT METHOD AND DEVICE

[75] Inventors: Klaus Dietrich, Gauting; Walter Kroy, Ottobrunn, both of Fed. Rep. of Germany

[73] Assignee: Messerschmitt-Boelkow-Blohm GmbH, Munich, Fed. Rep. of Germany

[21] Appl. No.: 454,090

[22] Filed: Dec. 28, 1982

[30] Foreign Application Priority Data

Jan. 14, 1982 [DE] Fed. Rep. of Germany ....... 3200838

[51] Int. Cl.[3] .............................................. H04N 3/14

[52] U.S. Cl. .................................... 358/213; 250/578

[58] Field of Search ............... 358/212, 213, 228, 293; 250/578

[56] References Cited

U.S. PATENT DOCUMENTS

| | | | |
|---|---|---|---|
| 3,814,846 | 6/1974 | Snow | 358/213 |
| 4,024,578 | 5/1977 | Sanner et al. | 358/213 |
| 4,330,796 | 5/1982 | Anagnostopoulos et al. | 358/213 |
| 4,430,673 | 2/1984 | Salomon et al. | 358/213 |
| 4,432,017 | 2/1984 | Stoffel et al. | 358/213 |
| 4,438,457 | 3/1984 | Tandon et al. | 358/213 |
| 4,446,485 | 5/1984 | Bardl | 358/213 |

*Primary Examiner*—Gene Z. Rubinson
*Assistant Examiner*—Robert Lev
*Attorney, Agent, or Firm*—W. G. Fasse; D. H. Kane, Jr.

[57] ABSTRACT

An image readout device is constructed to read out a partial image from a total image stored in photo detectors arranged in at least one row or two-dimensionally in rows and columns. The partial image may be of interest for a particular purpose, for example for the identification of a target, which does not require the processing of all the data representing the total image. The readout is accomplished by a series of switches arranged in a row and controlled by two shift registers in response to shift clock pulses. A logical "high (1)" state is loaded into a first shift register position (A) corresponding to the first detector position to be read out. All other shift register positions are loaded with the logical "low (0)" state. These logical states are then shifted in parallel into another second shift register which addresses the row of switches in a serial manner. A predetermined number of shift clock pulses determines the shift of the logical "high (1)" state from the first position (A) to a second position (B). These positions (A, B) determine the beginning and the end of the partial image readout of a row of photocells for example. The output signal at the output of the row of switches is provided only for those positions or locations which are determined by the shifting logical "high (1) " state. No output signal is provided for positions in the logical "low (0)" state. Thus the data flow and correspondingly the software and hardware have been substantially reduced.

4 Claims, 11 Drawing Figures

* START OF READOUT
* * READOUT OF INDIVIDUAL IMAGE DOTS

IMAGE READOUT METHOD AND DEVICE

CLAIM TO PRIORITY

The present application is based on German Ser. No. P 32 00 838.4 filed in the Federal Republic of Germany on Jan. 14, 1982. This priority is hereby claimed.

BACKGROUND OF THE INVENTION

The present invention relates to an image readout method and to an image readout device for reading out only a portion of an image representing information from detectors such as a plurality of photocells arranged in a row.

It is frequently not necessary to read out the entire image representing information content of an image detector. For example, it is sufficient, to read out only a portion of the information from the image detector when the portion is sufficient for the intended purpose, such as the tracking of a target.

German Pat. (DE-PS) No. 1,289,549 discloses an image converter system comprising a plurality of photo detectors arranged in rows and columns. Such prior art systems permit only the reading of the entire image from the detectors. However, as mentioned above, it is frequently desireable to read out only a partial image after the entire image has first been read out. As a result of such a partial readout it is possible to significantly reduce the data flow and accordingly also the software and hardware expense. Such partial image readout is for example satisfactory in connection with any earth surface and topographical reconnaissance and in connection with the tracking of a flying body. The detection and tracking of the targets, for example in connection with defense measures, may also be accomplished in a satisfactory manner by a partial image readout.

OBJECTS OF THE INVENTION

In view of the above it is the aim of the invention to achieve the following objects singly or in combination:

to provide a method and apparatus of the type mentioned above by means of which it is possible to read out only a small partial image section for reducing the data rate and for improving the reaction time of the system;

to tailor the image readout to those portions of the image which are important for a particular purpose and to avoid reading any other image portions; and to substantially increase the image frequency.

SUMMARY OF THE INVENTION

The invention provides a row of switching elements and two shift registers for each row of detector elements such as photocells arranged in a single row or in rows and columns in a two-dimensional manner. Prior to the readout the logical "high (1)" is stored at an adjustable or selectable location in one of the shift registers corresponding to the first position or location of the detector row to be read out. The logical "low (0)" is simultaneously stored in all other positions or locations of the one shift register. These logical low and high values stored in one shift register are transferred into the other shift register in parallel fashion. The other shift register addresses the row of switches in a serial manner. The logical "high (0)" at the selectable position in said one register is shiftable by means of a predetermined number of a shift clock pulses to a second predetermined or selectable position or location which determines the end of the portion or partial image to be read out. As a result, the two shift registers control the readout of the signals representing the image information from the detector row for transfer through the switching row to the respective output of the switching row.

As mentioned above, this type of system and the method of its operation make it possible to omit from the data processing most of the peripheral information and to process only the substantially smaller portion of information which is of interest around a particular location, such as a target. Surprisingly, this reduction in the data processing did not reduce or impair in any manner the quality of the image data information processing. Thus, where it was necessary heretofore, to read out a detector arrangement having a size of $256\times256=65\ 536$ pixel per image with a clock frequency of 1 MHz, a maximum image frequency of 15.3 Hz resulted. Contrary thereto, according to the invention, only that number of pixels is read out which is of actual interest. Thus, if the partial image is only for example $16\times16$ pixel the image frequency of 15.3 Hz is increased to 3.9 KHz.

BRIEF FIGURE DESCRIPTION

In order that the invention may be clearly understood, it will now be described, by way of example, with reference to the accompanying drawings, wherein.

Figure 6A:
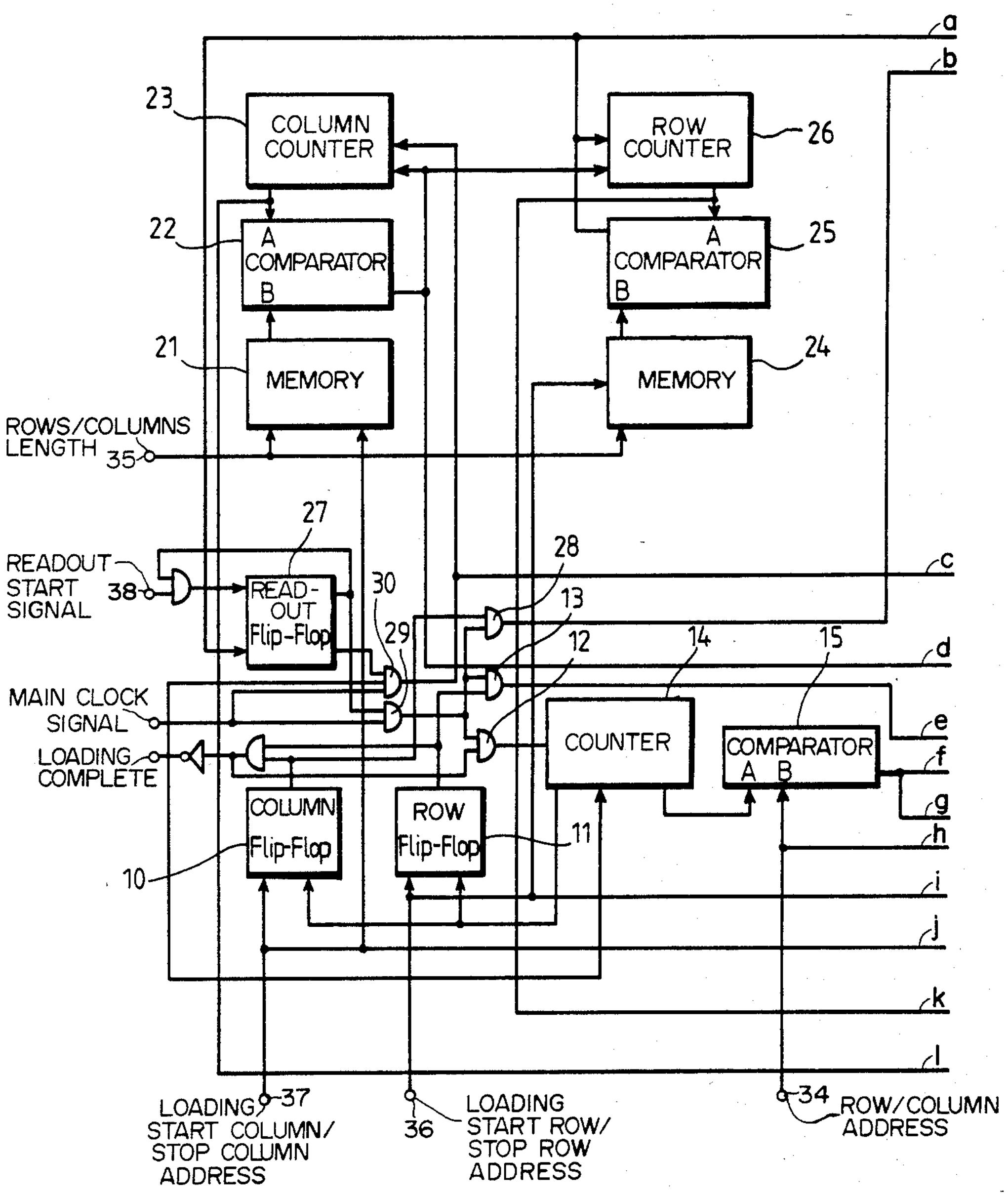
Figure 6B:
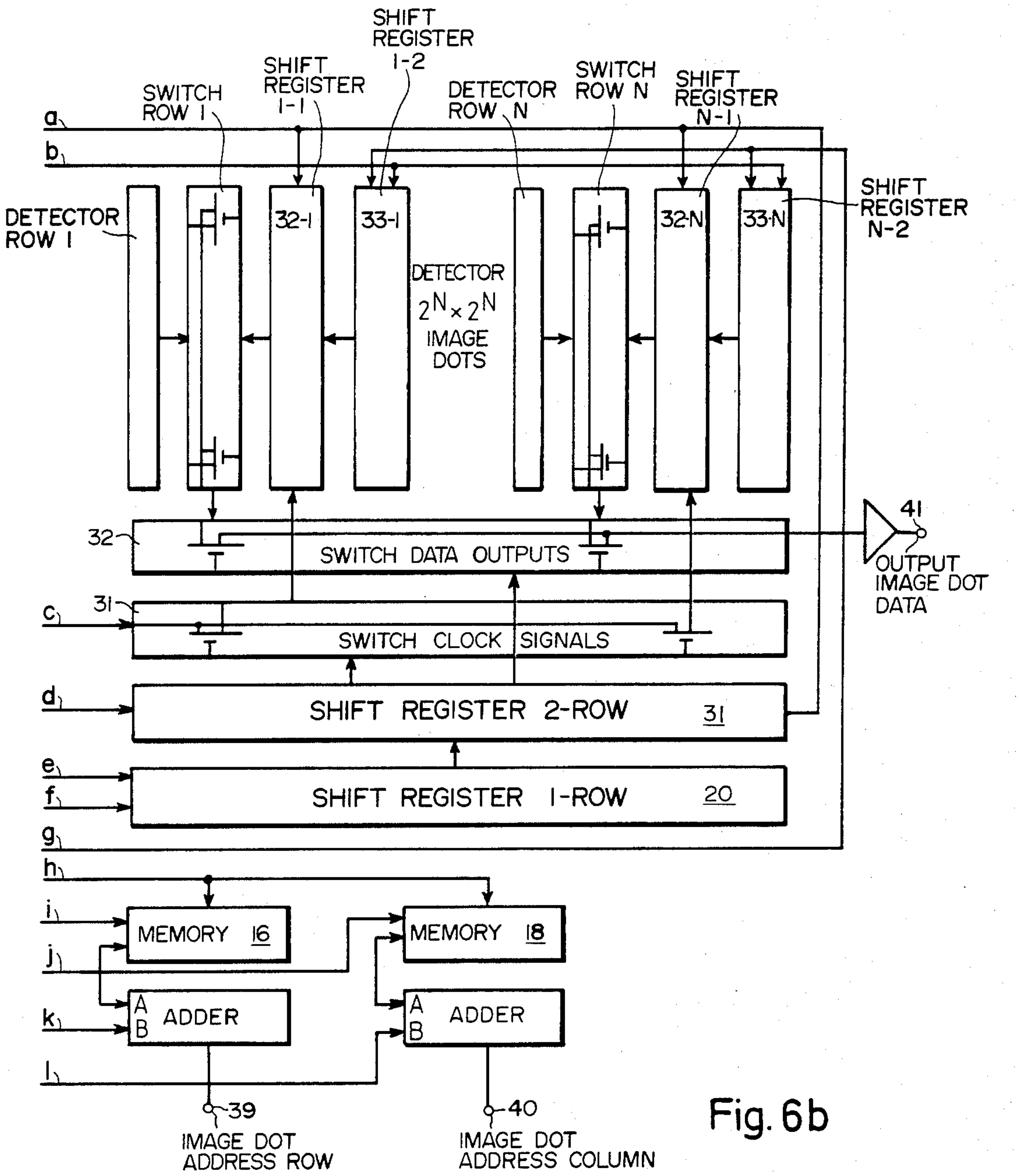
Figure 7:
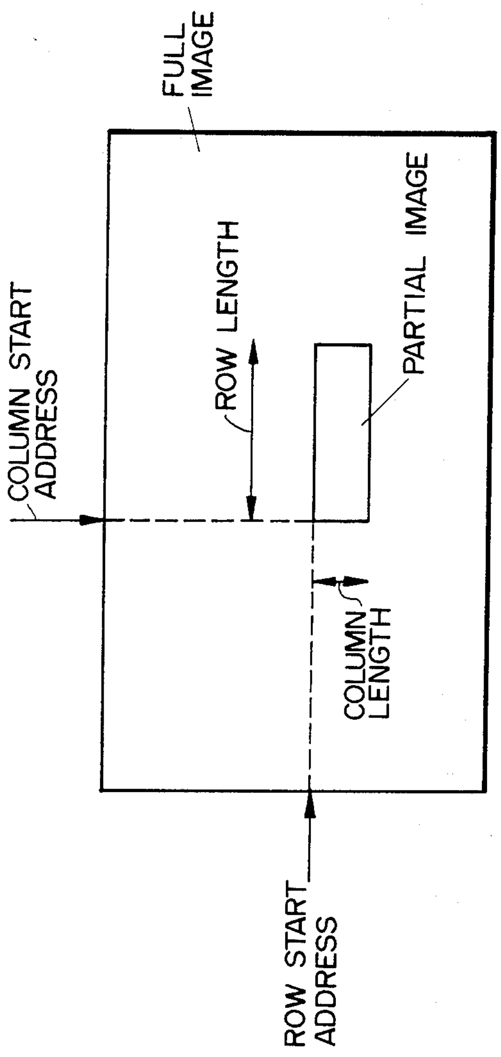

FIGS. 6*a* and 6*b* illustrate a block circuit diagram of a two-dimensional readout device according to the invention for reading out detectors arranged in rows and columns;

FIG. 7 illustrates the definition of the position and shape of a partial image for the circuit of FIGS. 6*a* and 6*b;*

Figure 8:
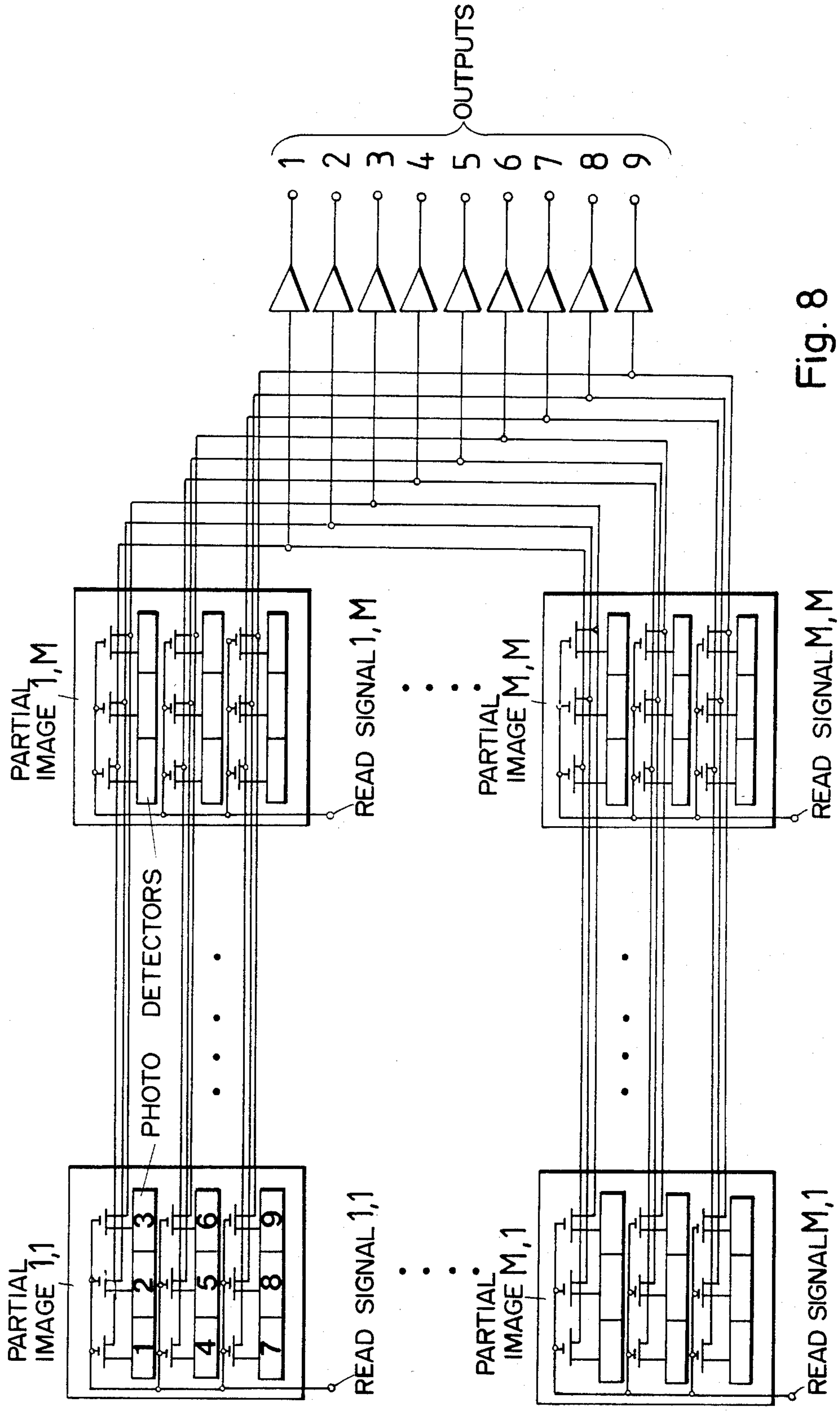
Figure 9:
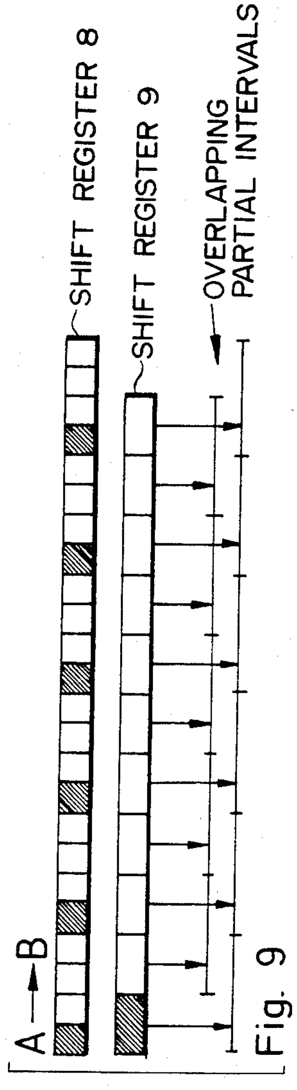

FIG. 8 illustrates an example of a two-dimensional readout device for reading out partial images of the size $3\times3$;

FIG. 9 illustrates an example of overlapping pixel intervals; and

Figure 10:
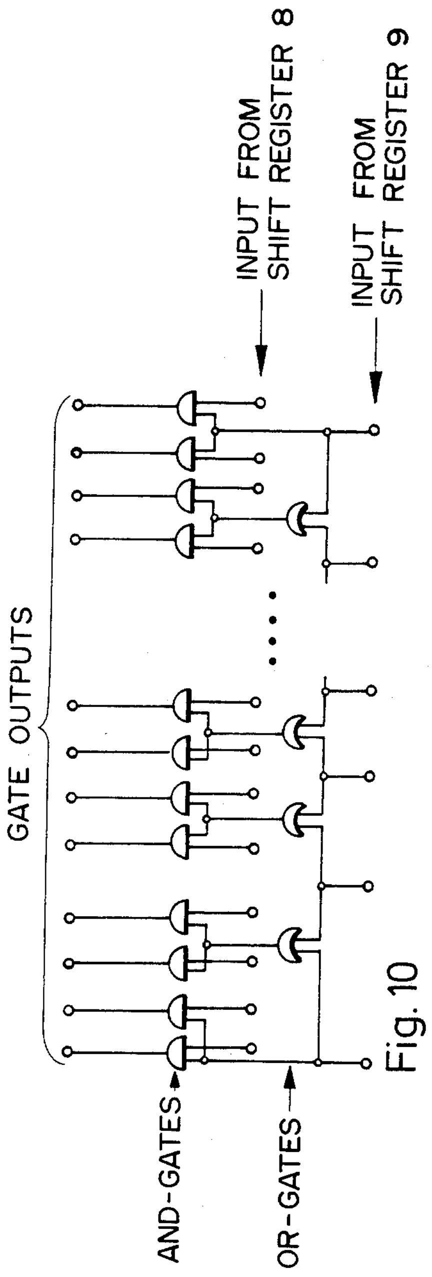

FIG. 10 shows the logic signal combining circuit network for the example of FIG. 9.

DETAILED DESCRIPTION OF PREFERRED EXAMPLE EMBODIMENTS AND OF THE BEST MODE OF THE INVENTION

Figure 1:
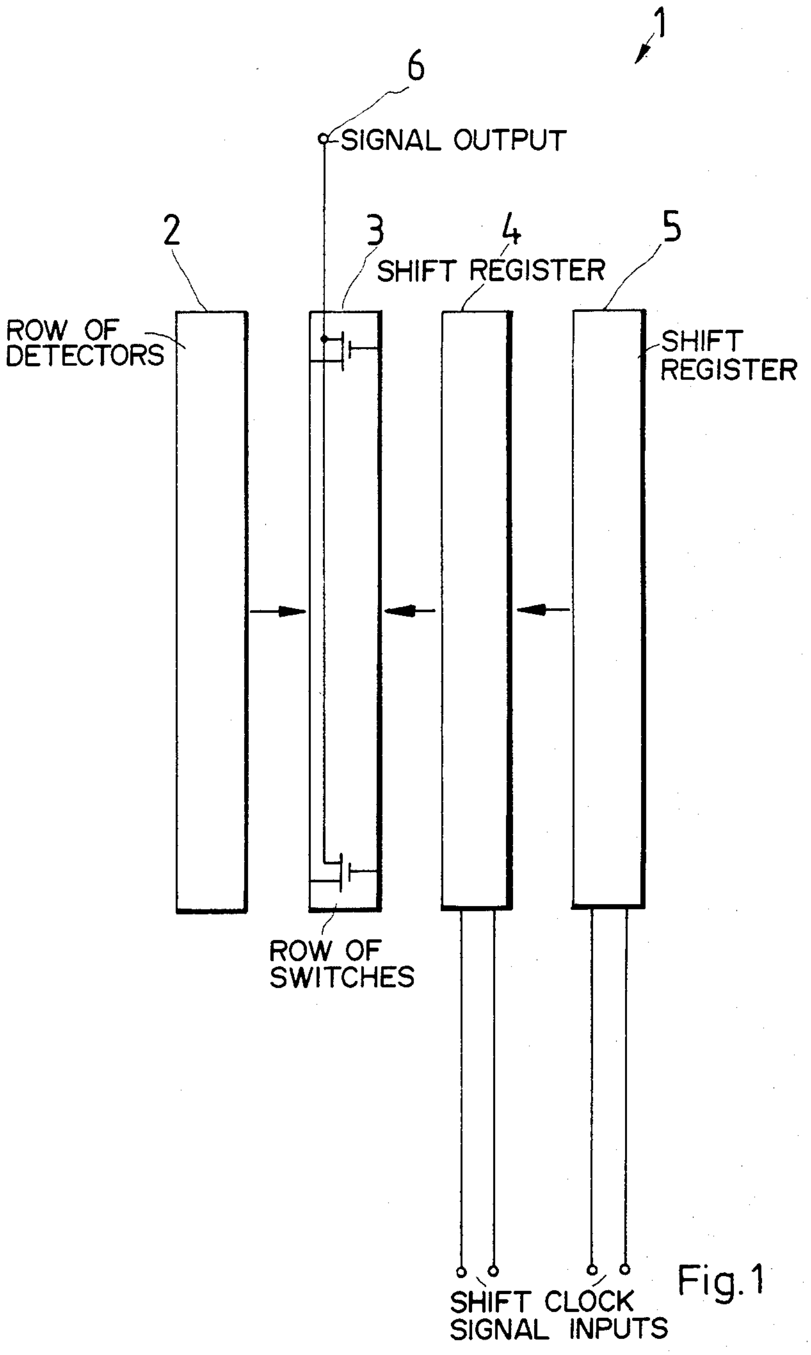
FIG. 1 is a block circuit diagram of a readout device according to the invention by means of which the size of a partial image is freely selectable.

Referring to FIG. 1, the basic readout device according to the invention comprises a plurality of detectors arranged in at least one detector row 2 or in rows and columns. A row of switches 3 having an output 6 is connected to serially address the detector row 2. A first shift register 5 having a shift clock signal input is operatively connected to a second shift register 4 also having a shift clock signal input. The content of the shift register 5 is to be transferred into the shift register 4 in parallel manner. The shift register 4 addresses the row of switches 3 in a serial manner. The detector row 2 may for example comprise a plurality of photo elements or cells arranged in series. However, other types of detectors may be involved, for example, acoustical detectors arranged in a row may be employed. The row 3 of switches comprises a plurality of electronic switches corresponding in number to the number of pixels of the detector row 2. The shift registers 4 and 5 may also be of conventional construction.

Figure 2:
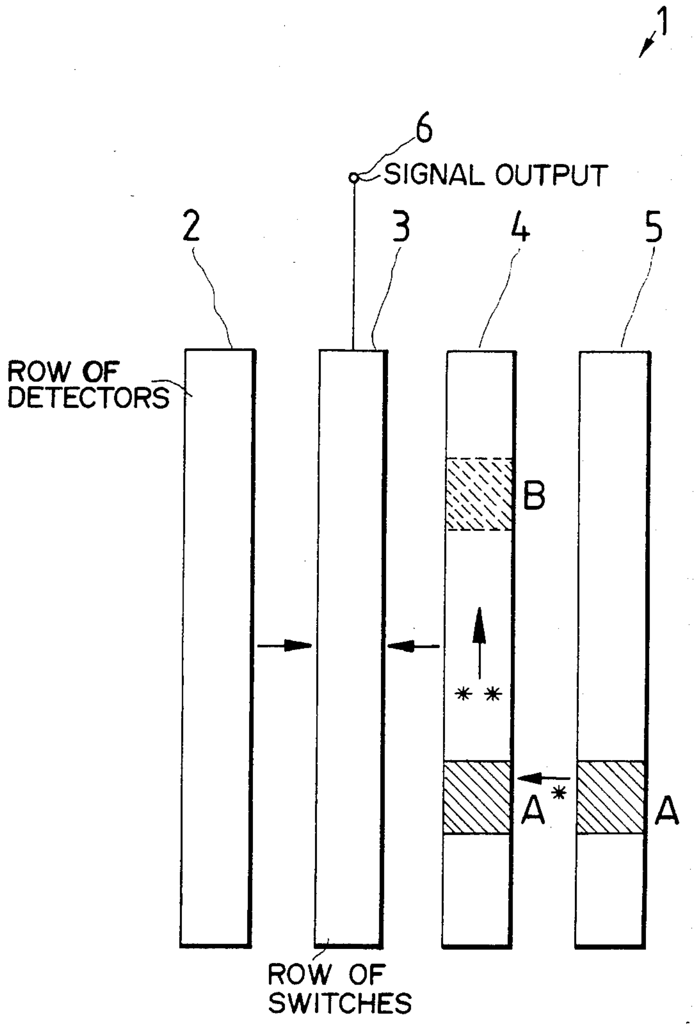
FIG. 2 is a flow diagram illustrating the operation of the system of FIG. 1.

The function or operation of the readout device according to FIG. 1 will now be described with reference to FIG. 2. Prior to the beginning of a readout of partial images the logical "high (1)" is stored at the location or position (A) of register 5. The position (A) corresponds to the first pixel to be read out from the corresponding detector row 2. All other stages or positions of the shift register 5 have stored therein the logical "low (0)". The storing of these data in shift register 5 takes place with the aid of shift clock signals in a serial manner. The content of the first shift register 5 is then loaded or transferred in a parallel fashion into the second shift register 4 at the beginning of the readout operation. The logical "high (1)" is then shifted during the readout of the detector row 2 from address or position (A) to the position or address (B) in the second shift register 4 by means of a predetermined number of shift clock pulses. As a result, the row of switches 3 passes the signal content of the addressed pixels of the detector row 2 to the signal output 6. This operation is repeated for each readout of each image or rather partial image whereby the address (A) designates the beginning and the address (B) designates the end of a partial image to be read out from the detector row 2.

If the address of the first pixel to be read out is to be changed, the content of the first shift register 5 is respectively changed. Further, if the length of the partial image to be read out is to be changed, the number of shift clock pulses in the second register 4 is respectively changed. These two changes may be made together or one or the other of the changes may be made for selecting the size and location of the partial image to be read out.

Figure 3:
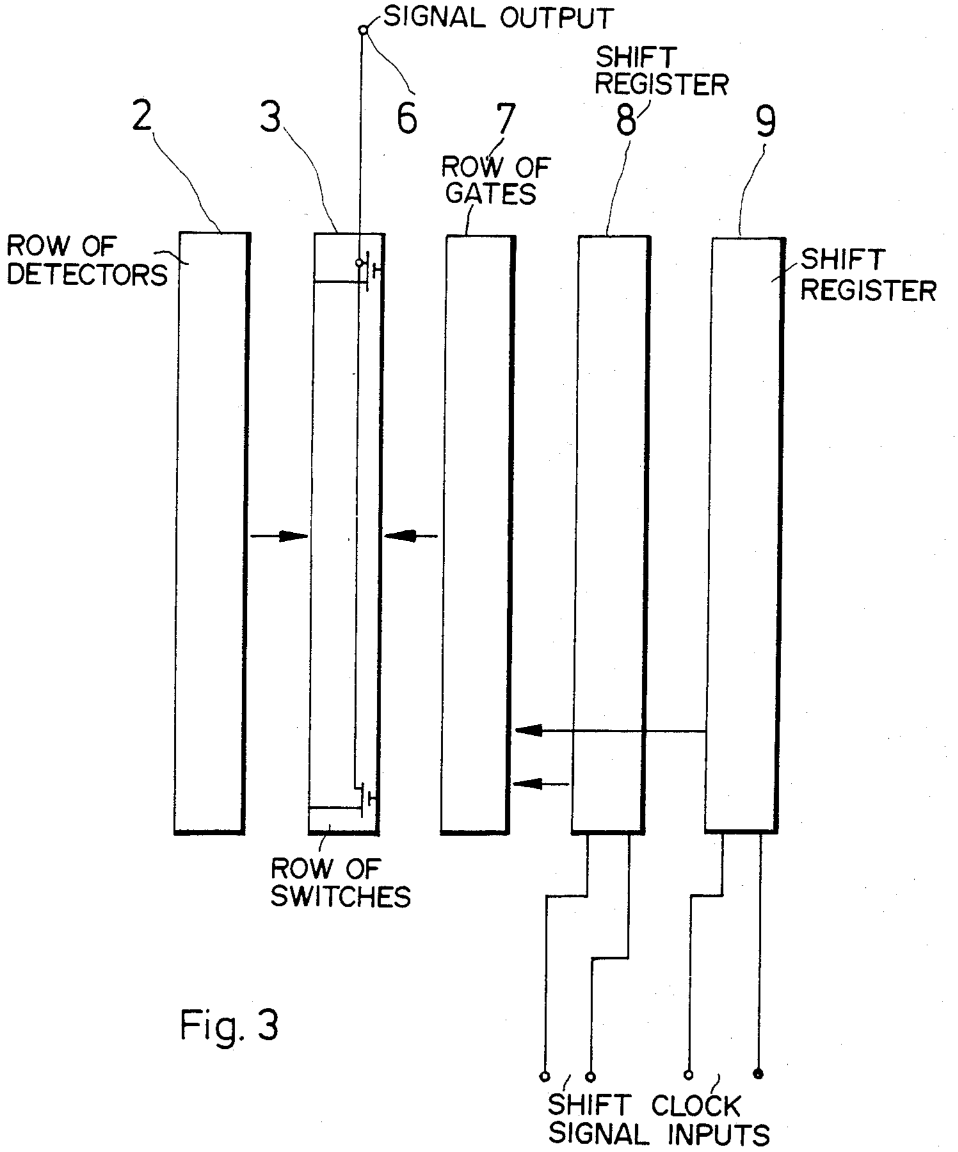
FIG. 3 is a system similar to that of FIG. 1, however illustrating a modification for deviding the entire image into a raster of image intervals.
Figure 4:
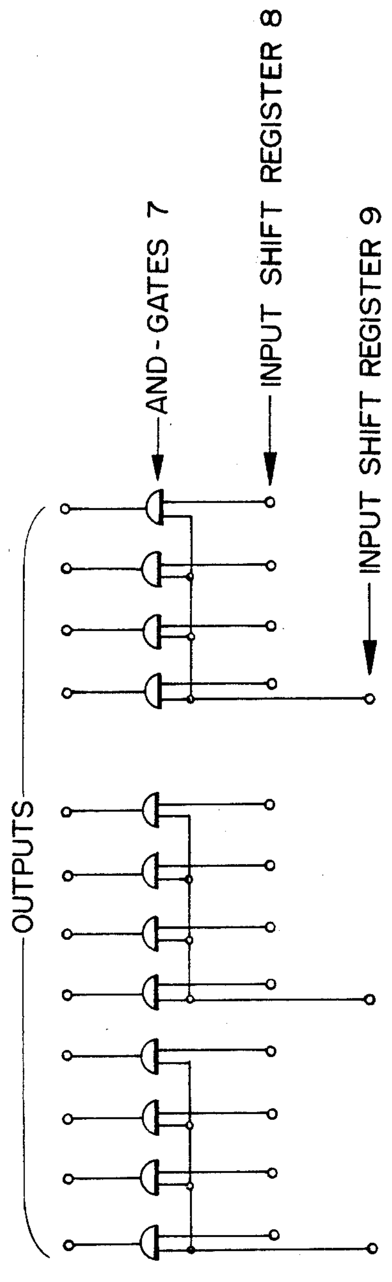
FIG. 4 shows groups of logic AND-gates for logically combining the content of the shift registers for controlling the readout from the detectors.
Figure 5:
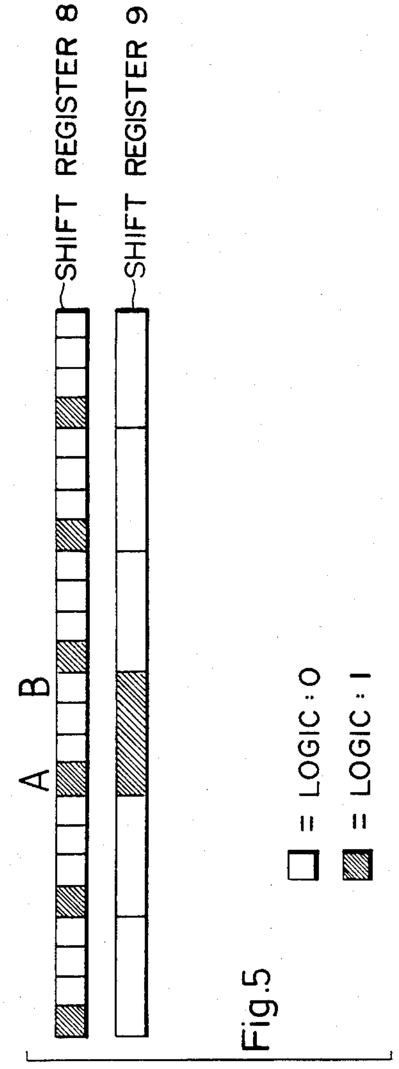
FIG. 5 shows the bit pattern for the logic signal combination.

FIGS. 3, 4 and 5 illustrate an example of the method in which the entire image is to be divided into a raster of partial image intervals. For this purpose the arrangement of AND FIG. 1 is supplemented by a row of gates 7 interposed between the row of switches 3 and the two shift registers 8 and 9. Contrary to the embodiment of FIG. 1, in FIG. 3 the two shift registers are logically combined through the row of AND-gates 7.

The raster of the partial image intervals to be produced is also determined by the bit pattern in the shift register 8. The selected partial image interval is defined by the bit pattern in the shift register 9. As mentioned above, the content of the shift register 8 is logically combined with the content of the shift register 9 through the row of AND-gates 7. The output signal of AND-the row of gates 7 controls the row of switches 3 for the readout addressing of the detector line 2.

In an arrangement comprising $2^N$ pixels per detector line the shift register 8 is also equipped with $2^N$ storage locations. The shift register 9 on the other hand is equipped with a number of storage locations $2^M$ which is smaller or than equal to the number of storage locations $2^N$ in the shift register 8, whereby the detector row 2 is divided into $2^M$ image intervals. The operation of the arrangement of FIG. 3 will now be described in more detail with reference to FIGS. 4 and 5. For example, a detector row may be divided into 24 pixels which in turn are divided into six partial image intervals. Prior to the readout operation a logical "high (1)" is stored or written in one storage location of the first shift register 9 for selecting the desired image interval. Further, the first pixel to be read out is determined by writing a logical "high (1)" into the respective first storage location for each interval in the shift register 8. The content of the shift register 8 is then shifted toward the right during the readout of the detector row 2. Due to the logic combination of the content of the shift registers 8 and 9 in the gate row 7 the signals representing the pixels from A to B are read out through the switching row 3. The AND-gate row 7 logically combines in an AND-fashion the outputs from the shift registers 8 and 9.

If it is desired to switch to another image interval, it is necessary to write a logical "high (1)" in a new location in the first shift register 9, which is accomplishd in a serial manner. If the period duration of the pixel selection frequency is $\tau_{CK}$, then the new programming is completed within the duration of $2\cdot\tau_{CK}$ (minimum value) to $2^{M+1}\cdot\tau_{CK}$ (maximum value) for the new selection of a partial image interval in such a two-dimensional detector arrangement comprising rows and columns. Thus, the entire image is divided into partial images corresponding in number to $2^{2M}$. The programming durations become the smaller, the smaller the number of the partial image intervals is. If it is desired to double the number of pixels per image interval, while using the same AND-gate row 7, and to quadruple the number of pixels per partial image, the number of logical "high (1)" states in the shift register 9 is also doubled and in the shift register 8 the spacing between the individual bits of the logical "high (1)" is also doubled.

FIGS. 9 and 10 illustrate an example for producing overlapping image intervals. For this purpose, the output of the shift register 9 is connectd to the inputs of OR-gates in the gate row 7. The output of the overlapping zones in the shift register 9 is illustrated in FIG. 9. The outputs of the shift register 8 are connected to the inputs of the AND-gates shown in FIG. 10. The logic signal combination of the OR-gates and of the AND-gates takes place in a conventional manner.

If this method is applied to two-dimensional devices, then the entire image is covered by four partial image rasters. The four rasters are displaced in the X-direction and in the Y-direction. Thus, in an instance, where a target is tracked by a flying body and the target is located between two partial images, a new image can be found in which the target is located solely within a partial image.

FIG. 6*a* shows an example of a circuit arrangement for a two-dimensional readout having the size of $2^N\times2^N$ pixels, whereby the partial image size is variable and adjustable as desired. The definition of the shape and position of the partial image within the full image is shown in FIG. 7. The position of the partial image within the full image of FIG. 7 is determined by the row start address, the row length, the column start address, and the column length.

FIG. 6*b* shows a readout device for rows and columns arranged in a two-dimensional system. It may be assumed, that the first row has the same elements as shown in FIG. 1. If the capacity of the readout device is $2^N\times2^N$ pixels it is seen that each detector row has its switching row as well as its two shift registers.

Additionally FIG. 6*b* shows two shift registers 1-ROW and 2-ROW as well as two switching rows 31 and 32. The shift register 1-ROW co-operates in parallel fashion with the switch clock signal switching row 31. The shift register 2-ROW co-operates in parallel fashion with the switch data output switch row 32, which receives the signals of the switching rows 1 to N for connection to the image dot data output 41. The switch clock signal of row 31 provides the clock signals to the shift registers 32-1 to 32-N. The present system may be programmed as follows. The data field or partial image to be read out is characterized according to FIG. 7 by the row start address, the row length, the column start address and the column length. These data are supplied to the system in the following programming steps for determining the location and size of a partial image to be read out:

(1) The row or column start address having a word length N-bits is digitally entered at the input (34). The loading instruction for the row or column start address is digitally applied to the respective input (37/36). The word length of the row or column corresponding to N-bits is digitally entered at the input (35). As a result:

(2) The row or column address is stored in the respective memory (16/18). The row or column length is stored in the respective memory (24/21).

(3) The row or column flip-flops (11/10) are set.

(4) The gate (12) is opened and thus the main clock signal is applied to the counter (14).

(5) The gate (13/28) is opened and thus the main clock signal is applied to the clock input of the shift register (20/33-1 to 33-N).

(6) For each of the following clock signals of the shift register (20/33-1 to 33-N) the content of the counter (14) is increased by one. The content of the counter (14) is compared in the comparator (15) with the desired line/column address at the input 34. If the two values are equal, then the equal output of the comparator (15) provides the logic (1), otherwise, if the values are not equal, it provides the logic (0). These values are supplied into the shift register (20/33-1 to 33-N).

(7) After N-counting pulses have appeared at the input of the counter (14) the counter (14) and the flip-flop (11/10) is reset by its carry signal. Thus the programming of the row start address and of the row length or of the column start address and of the column length is completed.

During the readout of the detector array only the selected partial array is read out, whereby at the outputs 39 and 40 the row and column addresses are provided corresponding to the signal of the read out pixel (output 38). After the readout of the entire partial array the row/column start values in the register (20/33-1 to 33-N) are again transferred into the register (31/32-1 to 32-N). Thereafter the next reading cycle of the same partial array may be started by a start signal at the input 38.

Although the invention has been described with reference to specific example embodiments, it will be appreciated, that it is intended to cover all modifications and equivalents within the scope of the appended claims.

Incidentally, the terminals a to 1 in FIG. 6*a* are connected to the same terminals a to 1 in FIG. 6*b*.

What is claimed is:

1. An image readout device for reading out a portion of an image representing information from detectors, comprising a plurality of image detectors arranged in at least one detector row or in detector rows and columns, switching means arranged in at least one switching row for each detector row said switching row having a signal output, means operatively connecting said switching row to its respective detector row for a readout addressing of individual image detectors and supplying respective image signals to said signal output, first and second shift register means for controlling said readout addressing, said first shift register means having a shift clock input and a plurality of outputs connected to said second shift register means for transferring the content of the first shift register means in parallel fashion into the second shift register means, said second shift register means also having a shift clock input and further means connecting said second shift register to said switching row for serially addressing said switching row, wherein said first shift register means is arranged for determining a readout starting location (A) designated by one logic value in a respective shift register location while the respective opposite logic value is present in all other shift register locations and wherein a predetermined number of shift clock pulses steps the second shift register means from said readout starting location (A) to a readout stop location (B), said readout starting and stopping locations determining said portion of an image representing information.

2. The readout device of claim 1 for dividing an image stored in a detector row into a raster of image intervals and for reading out one of said image intervals, further comprising a plurality of logic AND- gates arranged in a gate row operatively interposed between said second shift register means and said switching row, wherein the control of said readout addressing takes place through said gate row, said image intervals having a plurality of storage locations the first of which is determined by a logical "high (1)" written in said second shift register means, while the position and lengths of said image intervals are determined by a series of logical "highs (1)" written in sequence in said first shift register means, said logic gate row logically combining in said logic AND-gates the content of said first and second shift register means in response to a shifting of said one shift register means for said reading out of said one image interval.

3. A method for reading out a portion of image representing information from image detectors arranged in at least one detector row or in detector rows and columns by means of at least one row of switches and two shift registers, comprising the following steps: storing prior to any readout in a predetermined location of one of said shift registers the logical "high (1)" for designating a beginning (A) of a readout and storing in all other locations of the same one shift register the logical "low (0)", whereby said beginning is adjustable or selectable, loading said logical "high (1)" and said logical "low (0)" in parallel fashion into the other shift register, and addressing through said row of switches in serial fashion said detector row by means of said other shift register, and shifting by means of a predetermined number of shift clock pulses said beginning (A) of a first location to be read out to a predetermined end location (B), whereby said row of switches makes available at its output the signal content of those locations in said detector row as defined by said beginning (A) and said end location (B).

4. The method of claim 3, further comprising providing a row of logic AND-gates between said shift registers and said row of switches for addressing said row of switches in such a manner, that the image representing information in said detector row is divided into raster intervals, determining the beginnning of an image interval by writing a logic "high (1)" into one of said shift registers at the respective location, determining the position and length of said image interval by writing a series of logic "highs (1)" into the other shift register, reading out said partial image by shifting the content of said one shift register, and providing the image content signals at an output of said row of switches by logically combining in said row of logic AND- gates the logic content of said shift registers.

* * * * *